US012563432B2

(12) United States Patent
Singh et al.

(10) Patent No.: US 12,563,432 B2
(45) Date of Patent: Feb. 24, 2026

(54) 5G NEW RADIO (NR) OUT OF SERVICE OPTIMIZATIONS FOR INACTIVE STATE

(71) Applicant: Apple Inc., Cupertino, CA (US)

(72) Inventors: Ashish Kumar Singh, Munich (DE);
Avinash Venugopal, San Diego, CA
(US); Xiaolin Zhao, San Diego, CA
(US)

(73) Assignee: APPLE INC., Cupertino, CA (US)

( * ) Notice: Subject to any disclaimer, the term of this
patent is extended or adjusted under 35
U.S.C. 154(b) by 489 days.

(21) Appl. No.: 17/814,412

(22) Filed: Jul. 22, 2022

(65) Prior Publication Data

US 2023/0069750 A1 Mar. 2, 2023

Related U.S. Application Data

(60) Provisional application No. 63/239,182, filed on Aug.
31, 2021.

(51) Int. Cl.
| | |
|---|---|
| *H04W 76/27* | (2018.01) |
| *H04B 17/318* | (2015.01) |
| *H04W 24/10* | (2009.01) |

(52) U.S. Cl.
CPC .......... *H04W 24/10* (2013.01); *H04B 17/318*
(2015.01); *H04W 76/27* (2018.02)

(58) Field of Classification Search
None
See application file for complete search history.

(56) References Cited

U.S. PATENT DOCUMENTS

| | | | | |
|---|---|---|---|---|
| 8,914,027 | B2 * | 12/2014 | Kone ............... | H04W 36/0079 |
| | | | | 455/437 |
| 2004/0203778 | A1 * | 10/2004 | Kuo ...................... | H04W 76/27 |
| | | | | 455/432.1 |
| 2013/0142111 | A1 * | 6/2013 | Kim ....................... | H04L 1/189 |
| | | | | 370/329 |
| 2017/0347296 | A1 * | 11/2017 | Wu ........................ | H04W 76/18 |
| 2018/0302947 | A1 * | 10/2018 | Yan ....................... | H04W 76/38 |
| 2019/0069229 | A1 * | 2/2019 | Lee ....................... | H04W 48/18 |
| 2020/0053821 | A1 * | 2/2020 | Shih ...................... | H04W 48/20 |
| 2020/0260384 | A1 * | 8/2020 | Ryu .................. | H04W 52/0261 |
| 2020/0305014 | A1 * | 9/2020 | Kim ....................... | H04W 24/10 |
| 2021/0105853 | A1 * | 4/2021 | Kang .................... | H04W 76/27 |
| 2021/0337481 | A1 * | 10/2021 | Goel ................ | H04W 52/0229 |
| 2021/0385727 | A1 * | 12/2021 | Ohlsson ............... | H04W 48/02 |
| 2023/0050907 | A1 * | 2/2023 | Sheik .................... | H04W 76/10 |
| 2023/0337140 | A1 * | 10/2023 | Miao ..................... | H04L 5/0053 |

* cited by examiner

*Primary Examiner* — Khaled M Kassim
*Assistant Examiner* — Shima Wasel
(74) *Attorney, Agent, or Firm* — Sterne, Kessler,
Goldstein & Fox, P.L.L.C.

(57) ABSTRACT

Aspects are described for a user equipment (UE) comprising
a transceiver configured to enable wireless communication
with a base station, and a processor communicatively
coupled to the transceiver. The processor is configured to
enter a radio resource control (RRC) inactive mode and
camp on a first cell. The processor is further configured to
detect an out of service (OOS) status and set a RAN-based
notification area (RNA) parameter, wherein the UE refrains
from discarding an access stratum (AS) inactive context
based on the RNA parameter. The processor is further
configured to camp on a second cell and transmit a message
to the base station to report an RNA update responsive to
camping on the second cell.

12 Claims, 8 Drawing Sheets

5G NEW RADIO (NR) OUT OF SERVICE OPTIMIZATIONS FOR INACTIVE STATE

CROSS-REFERENCE TO RELATED APPLICATIONS

The present application claims the benefit of U.S. Provisional Patent Application No. 63/239,182, filed on Aug. 31, 2021, which is hereby incorporated by reference in its entirety.

BACKGROUND

Field

The described aspects generally relate to a RAN-based notification area (RNA) reporting in an inactive mode.

SUMMARY

Some aspects of this disclosure relate to systems, apparatuses, and methods for implementing a RAN-based notification area (RNA) update (RNAU) of a user equipment (UE) in a radio resource control (RRC) inactive mode. For example, the systems, the apparatuses, and the methods are provided for implementing the RNA report when a UE is out of service in the RRC inactive mode. The RRC inactive mode can also be referred to as a RRC inactive state.

Some aspects of this disclosure relate to a UE comprising a transceiver configured to enable wireless communication with a base station, and a processor communicatively coupled to the transceiver. The processor is configured to enter an RRC inactive mode and camp on a first cell. The processor is further configured to detect an out of service (OOS) status and set an RNA parameter, wherein the UE refrains from discarding an access stratum (AS) inactive context based on the RNA parameter. The processor is further configured to camp on a second cell and transmit a message to the base station to report an RNA update responsive to camping on the second cell.

Some aspects of this disclosure relate to a method of operating a UE. The method comprises entering an RRC inactive mode and camping on a first cell. The method further comprises detecting an OOS status and setting an RNA parameter, wherein the UE refrains from discarding an AS inactive context based on the RNA parameter. The method further comprises camping on a second cell and transmitting a message to the base station to report an RNA update responsive to camping on the second cell.

Some aspects of this disclosure relate to a non-transitory computer-readable medium (CRM) comprising instructions to, upon execution of the instructions by one or more processors of a UE, cause the UE to perform operations. The operations comprise entering an RRC inactive mode and camping on a first cell. The operations further comprise detecting an OOS status and setting an RNA parameter, wherein the UE refrains from discarding an AS inactive context based on the RNA parameter. The operations further comprise camping on a second cell and transmitting a message to the base station to report an RNA update responsive to camping on the second cell.

This Summary is provided merely for the purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
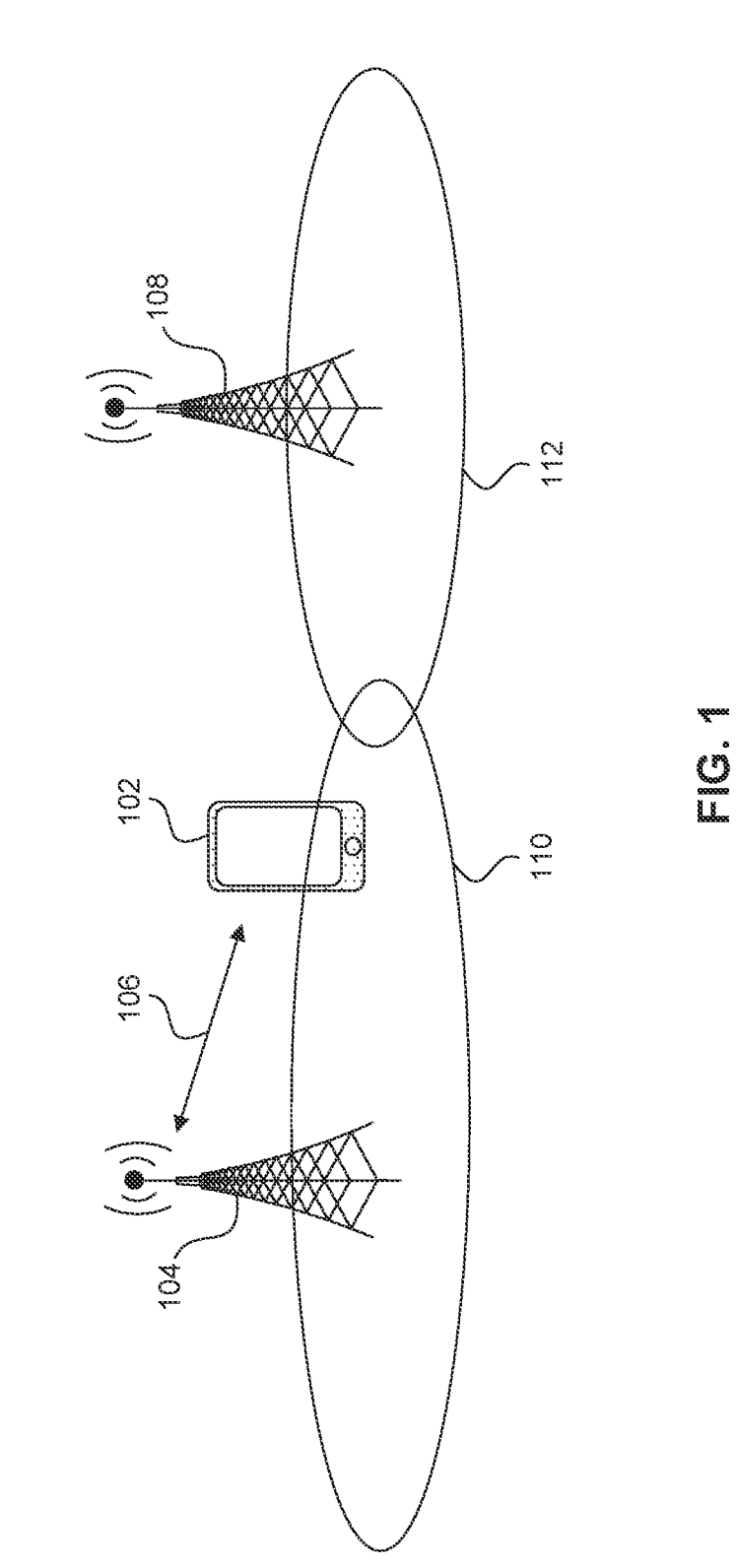
FIG. 1 illustrates an example system implementing a RAN-based notification area (RNA) reporting in an inactive state, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing a RAN-based notification area (RNA) update (RNAU) of a user equipment (UE) in an RRC inactive state. For example, the systems, the apparatuses, and the methods are provided for implementing the RNA report when a UE is out of service in the RRC inactive state.

In some aspects, a UE can enter an RRC idle mode to reduce power consumption. In the RRC idle mode, the UE performs fewer radio transmissions to and from a base station compared with an RRC connected mode. The UE can also enter an RRC inactive mode from the RRC connected mode. The UE can also enter the RRC idle mode from the RRC inactive mode. The RRC connected mode, the RRC inactive mode, and the RRC idle mode can also be referred to as an RRC connected state, an RRC inactive state, and an RRC idle mode respectively. Similar to the RRC idle mode, the UE in the RRC inactive mode performs fewer radio transmissions, but can return to the RRC connected mode quickly using information available in the UE and the base station. For example, in the RRC inactive mode, the UE stores an access stratum (AS) inactive context in its memory. A base station serving the UE can assign and transmit the AS inactive context to the UE when the UE is in the RRC connected mode. The base station can also store a second AS inactive context. The AS inactive context and the second inactive context include configuration information regarding the RRC connection. In some aspects, the AS inactive context corresponds to the second AS inactive context. For example, both the AS inactive context and the second AS inactive context can include a cell identification and a UE identification.

In some aspects, the UE can perform an RNA reporting to the base station in the RRC inactive mode. The UE can perform the RNA reporting after a timer expires. For example, the UE starts a T380 timer when entering the RRC inactive mode and performs the RNA reporting when the T380 timer expires. In the RNA reporting, the UE reports to the base station a cell the UE camps on. For example, the UE can camp on a first cell when entering the RRC inactive mode and move close to a second cell. The UE can perform a cell reselection and camp on the second cell. In such a case, the UE can report the second cell to the base station in the RNA reporting so that the base station can connect the UE with the second cell when the UE enters the RRC connected mode.

In some aspects, the UE can be in an out of service (OOS) status. For example, the UE moves away/loses coverage from the first cell, but does not camp on any cell. In such a case, the UE has no camping cell to report to the base station. For another example, the UE may include a multiple subscriber identity module (MSIM) where the UE has at least a first and a second SIM cards. In some aspects, the first and the second SIM cards operate based on one set of physical transceivers. For example, both the first and the second SIM cards may transmit and receive signals via a set of antennas. When the first SIM card performs a voice call, the second SIM card is in the OOS status. In either case, when the UE is OOS, it is not clear whether or not to keep the AS inactive context and how long the UE keeps the AS inactive context. On one hand, the UE may later camp on a cell that is consistent with the AS inactive context (same previous cell or a cell belonging to a same RNA). The UE can keep the AS inactive context and report to that cell. In this way, the UE can stay in the RRC inactive mode or enter the RRC connected mode afterward. On the other hand, the UE may later camp on a cell that is inconsistent with the AS inactive context (belonging to a different RNA). In such a case, because the UE may not know when and what kind of cell it will camp on. The timing of discarding the inactive context is important. For example, if the UE is successfully in coming back in service and camping on a new cell before a T380 guard timer expires on the base station, UE can still trigger an RNA update for the new cell belonging to a different RNA and maintain synchronization with base station while staying in RRC Inactive Mode.

FIG. 1 illustrates an example system 100 implementing an RNAU in an RRC inactive state, according to some aspects of the disclosure. The example system 100 is provided for the purpose of illustration only and does not limit the disclosed aspects. The example system 100 may include, but is not limited to, a UE 102, a base station 104, and a base station 108. The UE 102 may be implemented as an electronic device configured to operate based on a wide variety of wireless communication techniques. These techniques may include, but are not limited to, techniques based on 3rd Generation Partnership Project (3GPP) standards. For example, the UE 102 can be configured to operate using one or more 3GPP releases, such as Release 15 (Rel-15), Release 16 (Rel-16), Release 17 (Rel-17), or other 3GPP releases.

The UE 102 may include, but is not limited to, wireless communication devices, smartphones, laptops, desktops, tablets, personal assistants, monitors, televisions, wearable devices, Internet of Things (IoT) devices, vehicle communication devices, and the like. The base stations 104 and 108 may include one or more nodes configured to operate based on a wide variety of wireless communication techniques such as, but not limited to, techniques based on the 3GPP standards. For example, the base stations 104 and 108 may include nodes configured to operate using Rel-15, Rel-16, Rel-17, or other 3GPP releases. The base stations 104 and 108 may include, but not limited to, NodeBs, eNodeBs, gNBs, new radio base stations (NR BSs), access points (APs), remote radio heads, relay stations, and others.

In some aspects, the UE 102 connects with the base station 104 via a communication link 106. In an RRC connected mode, the UE 102 transmits to and receives from the base station 104 via the communication link 106. The base station 104 may support a cell 110. The cell 110 can be a primary cell serving the UE 102. In some aspects, the UE 102 can enter an RRC inactive mode. In the RRC inactive mode, the UE 102 reduces a number of transmission to and receiving from the base station 104. The UE 102 also stores an AS inactive context in a memory of the UE 102 in order to resume an RRC connection with the base station 104 quickly. In some aspects, the base station 104 also stores a second AS inactive context corresponding to the AS inactive context in the UE 102. The AS inactive context and the second inactive context may include an identification of the UE 102 and information of one or more cells including the cell 110. In addition, the AS inactive context and the second inactive context include RRC configuration information that can be used to quickly resume the RRC connection between the UE 102 and the base station 104. In some aspects, to resume the RRC connection quickly, the UE 102 is required to have the AS inactive context and the base station 104 is required to have the second AS inactive context.

In some aspects, the UE 102 camps on a cell, such as the cell 110, when entering the RRC inactive mode. The UE 102 can receive paging messages from the base station 104 to resume the RRC connection. In some aspects, the UE 102 can move away from the cell 110 and camp on another cell, such as a cell 112. The cell 112 can be supported by a base station 108 or the base station 104. Because the UE 102 is in the RRC inactive mode, the UE 102 can report this change to the base station 104. For example, UE 102 can transmit an RNA update to the base station 104, wherein the RNA update indicate that the UE 102 camps on the cell 112. The UE 102 can trigger the RNA report when camping on a cell outside an RNA. For example, the cell 110 is within a first RNA and the cell 112 is within a second RNA. In such a case, the UE 102 triggers the RNA report to the base station when camping on the cell 112. In some aspects, the UE 102 determines that the cell 112 is not within the first RNA based on a cell ID of the cell 112. The UE 102 can also determine that the cell 112 is not within the first RNA based on an inconsistency between the AS inactive context and the cell 112. For example, the AS inactive context can indicate one or more cells within the first RNA and other RNAs, but does not indicate the cell 112. In some aspects, the UE 102 can trigger the RNA report when a timer expires. The UE 112 can start a timer, such as a timer T380 or a timer T390, when entering the RRC inactive mode. The UE 112 triggers the RNA reporting when the timer expires.

In some aspects, the UE 102 can enter an OOS status. For example, the UE 102 moves away from or outside the range of the cell 110. The UE 102 can scan signals received from the cell 110 and determine that a signal level, such as a reference signal received power (RSRP) level or a reference signal received quality (RSRQ) level, of the cell 110 is below a threshold. In such a case, the UE 102 cease to camp on the cell 110. The UE 102 then performs cell reselection by scan signals of other neighboring cells to locate a cell to camp on. Before the UE 102 camps on another cell, the UE 102 is in the OOS status. In some aspects, the UE 102 refrain from reporting the RNA update in the OOS status because there is no cell to report.

In some aspects, when in the OOS status, the UE 102 may discard the AS inactive content when entering the OOS status because the AS inactive content may not be useful anymore. For example, the UE 102 can camp on a cell that is inconsistent with the AS inactive content and the UE 102 cannot use the AS inactive content to resume the RRC connection. On the other hand, if the UE 102 later camps on a cell that is consistent with the AS inactive content, the UE 102 can use the AS inactive content to resume the RRC connection. In some aspects, the UE 102 can handle the AS inactive content in one of three approaches: (1) discarding the AS inactive content when entering the OOS status or upon expiration of a timer; (2) refraining from discarding the AS inactive content; and (3) discarding the AS inactive content when the base station 104 discards the second AS inactive content.

Figure 2:
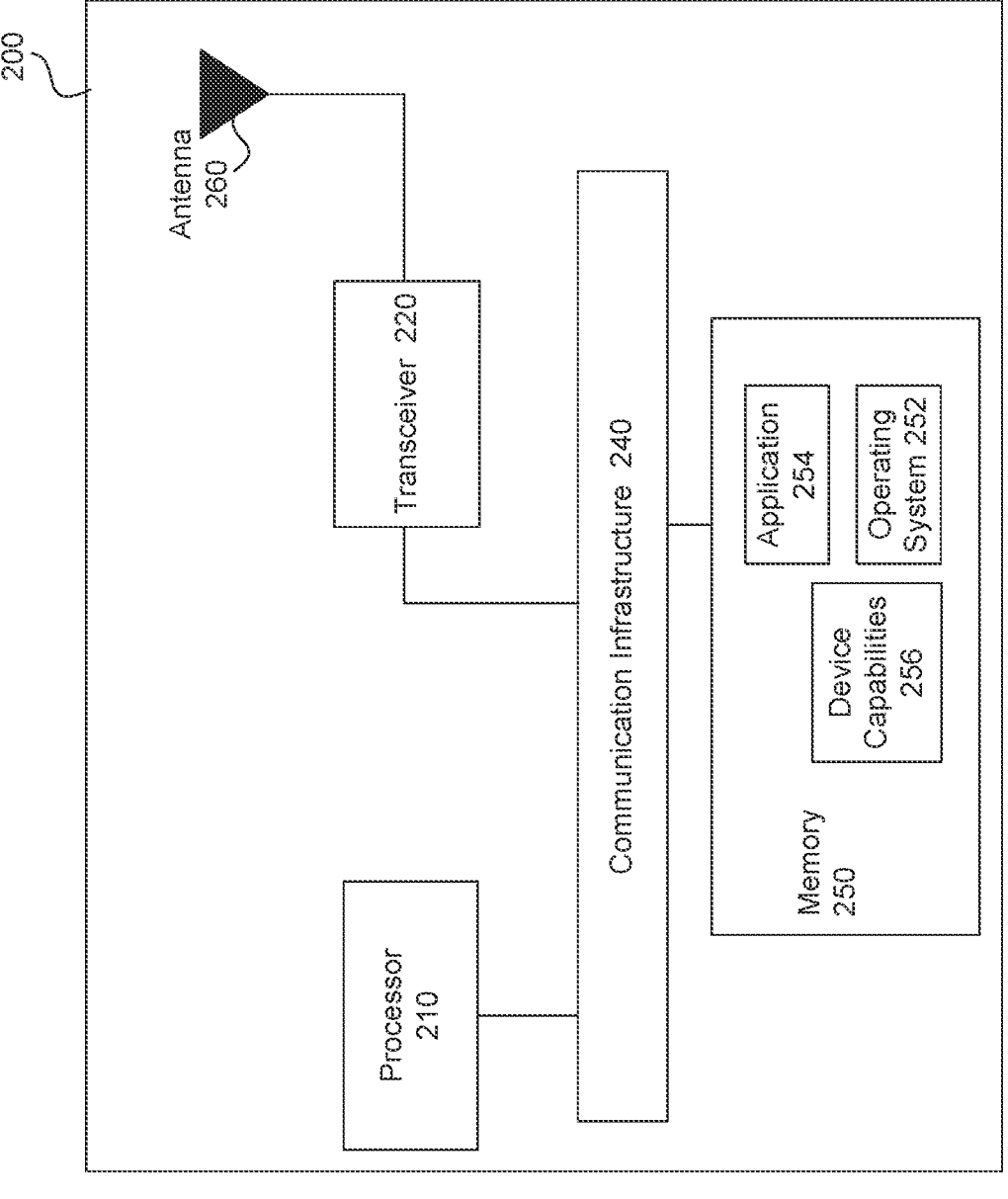
FIG. 2 illustrates a block diagram of an example system of an electronic device for the RNA reporting in an inactive state, according to some aspects of the disclosure.

FIG. 2 illustrates a block diagram of an electronic device 200 implementing the RNAU in an inactive state, according to some aspects of the disclosure. The electronic device 200 may be any of the electronic devices (e.g., the UE 102, and the base stations 104 and 108) of the system 100. The electronic device 200 includes a processor 210, one or more transceivers 220, a communication infrastructure 240, a memory 250, an operating system 252, an application 254, device capabilities 256, and antennas 260. Illustrated systems are provided as exemplary parts of electronic device 200, and electronic device 200 may include other circuit(s) and subsystem(s). Also, although the systems of electronic device 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. The applications in the application 254 may include applications such as, but not limited to, radio streaming, video streaming, remote control, and/or other user applications. In some aspects, the device capabilities 256 may be stored in the memory 250.

The electronic device 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling electronic device 200 of the system 100 to implement mechanisms for the RNA reporting, as described herein. Alternatively, or additionally, the processor 210 can be "hard coded" to implement mechanisms for the RNA reporting in an inactive state, as described herein.

The one or more transceivers 220 transmit and receive communications signals support mechanisms for the RNA reporting in an inactive state. Additionally, the one or more transceivers 220 transmit and receive communications signals that support mechanisms for measuring communication link(s), generating and transmitting system information, and receiving the system information. According to some aspects, the one or more transceivers 220 may be coupled to the antennas 260 to wirelessly transmit and receive the communication signals. The antennas 260 may include one or more antennas that may be the same or different types and can form one or more antenna ports. The one or more transceivers 220 allow electronic device 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

As discussed in more detail below with respect to FIGS. 3-8, processor 210 may implement different mechanisms for the RNA reporting as discussed with respect to the system 100 of FIG. 1.

Figure 3:
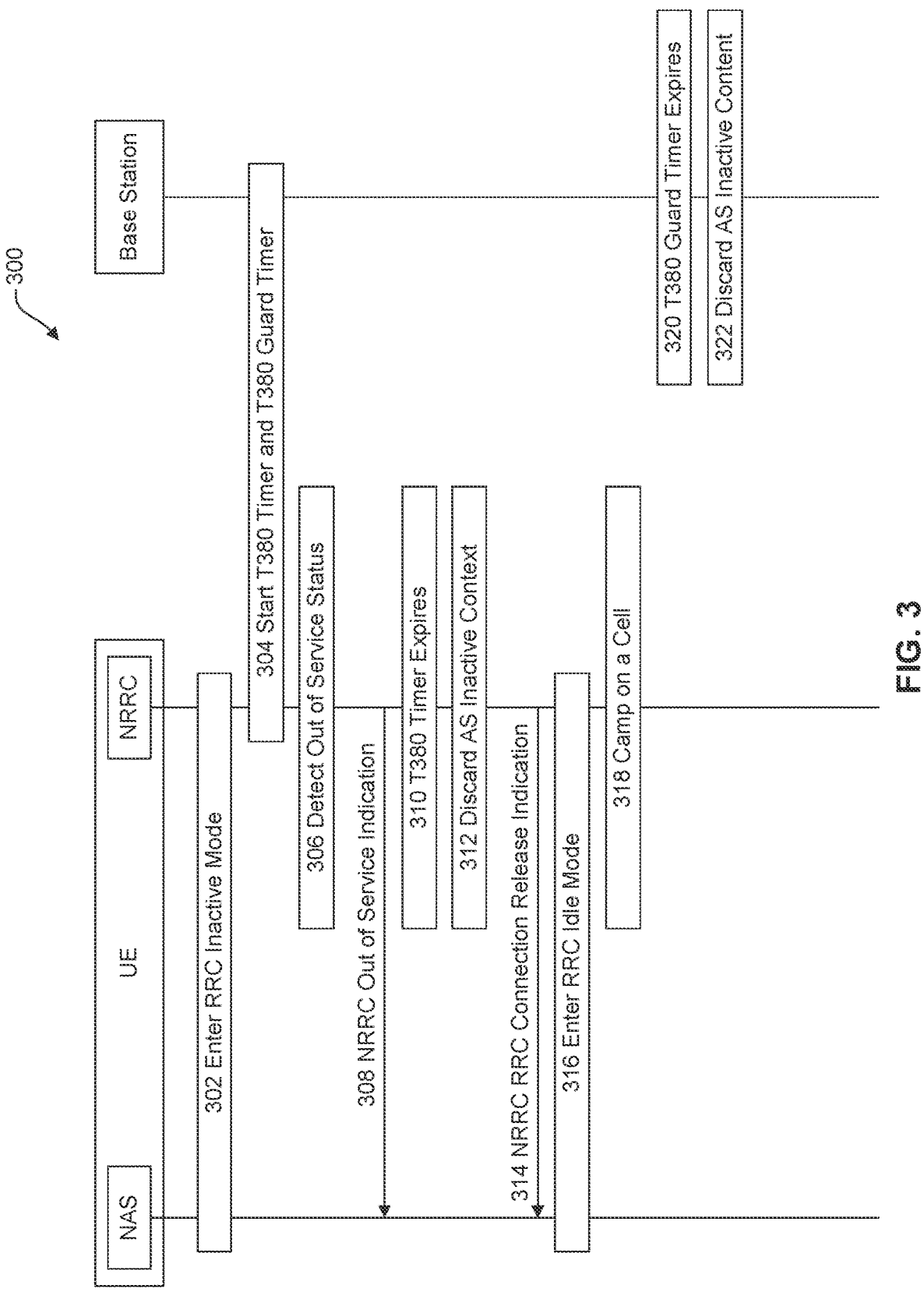
FIG. 3 illustrates an example method of the RNA reporting with early discarding of an access stratum (AS) inactive context, according to aspects of the disclosure.

FIG. 3 illustrates an example method 300 of the RNAU with early discarding of an AS inactive context. The example method 300 is provided for the purpose of illustration only and does not limit the disclosed aspects. As a convenience and not a limitation, FIG. 3 may be described with regard to elements of FIGS. 1, 2, and 8. The example method 300 may represent the operation of electronic devices (for example, the UE 102, and the base stations 104 and 108 of FIG. 1) implementing the RNA reporting. The example method 300 may also be performed by the electronic device 200 of FIG. 2, controlled or implemented by processor 210, and/or computer system 800 of FIG. 8. But the example method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, a UE, such as the UE 102, enters the RRC inactive mode. In some aspects, the UE operates a new radio (NR) radio resource control (NRRC) layer and a non-access stratum (NAS) layer. The NAS layer is a higher layer than the NRRC layer.

At 304, the UE starts a first timer, such as a T380 timer. A base station, such as the base station 104, starts a second timer, such as the T380 guard timer. The timer can also be a T390 timer or other kinds of timers. In some aspects, a period of the first timer is shorter than a period of the second timer. In other words, when the first timer expires on the UE side, the second timer is still running on the base station side.

At 306, the UE detects an OOS status. The UE can scan, via the NRRC layer, received signals from a first cell where the UE camps on, such as the cell 110. The UE may determine that an RSRP level or an RSRQ level of the received signals is below a threshold and the UE is OOS.

At 308, the NRRC layer reports the OOS status by transmitting an internal message, such as an NRRC out of service indication or an NRRC_ACT_FAIL_IND message, to the NAS layer. The NAS layer can initiate a cell searching to locate a cell to camp on.

At 310, the first timer, such as the T380 timer, expires prior to the UE camping on any cells. As discussed above, the second timer, such as the T380 guard timer, is still running on the base station side.

At 312, the UE discards the AS inactive context after the timer expires. The UE may determine that the AS inactive context is no longer useful or the UE needs to free up memory space storing the AS inactive context. In some aspects, the UE is configured to report an RNA update to the base station after the timer expires. However, since the UE is in the OOS status and does not camp on any cells, the UE does not report the RNA update.

In some aspects, the first timer on the UE side and the second timer on the base station side are optional. In case the base station does not configure the first timer and the second timer, the UE may discard the AS inactive context after detecting the OOS status at 306.

At 314, the NRRC layer transmits an RRC connection release indication to the NAS layer indicating that the AS inactive context is discarded.

At 316, the UE enters the RRC idle mode. The UE transfers from the RRC inactive mode to the RRC idle mode because the UE can no longer resume the RRC connection using the AS inactive context. In some aspects, the UE can also enter an RRC DEACT mode when the UE is OOS. In the RRC DEACT mode, the UE does not camp on any cells.

For example, the UE may be turned off or in a process of searching a cell to camp on in the RRC DEACT mode.

At 318, the UE camps on a second cell. For example, the NAS layer can transmit an action request, such as an NRRC_ACT_REQ message, to the NRRC layer after 308 as discussed above. The NRRC layer then scans neighboring cells and determines that signal strengths, such as the RSRP level or the RSRQ level, of the second cell is above the threshold. The NRRC layer can perform the scanning after the step 308 and until the step 318. The NRRC layer then transmits an action confirmation message, such as an NRRC_ACT_CNF message, to the NAS layer and camps on the second cell. In some aspects, the second cell can be the same cell that the UE camped on prior to entering the OOS status, such as the cell 110. The second cell can also be a different cell, such as the cell 112. In either case, the UE does not report the RNA update because the UE is in the RRC idle mode.

At 320, the second timer, such as the T380 guard timer, expires and the base station discards the second AS inactive context at 322. In such a case, the base station assumes that the UE still camps on the first cell, such as the cell 110, because the UE does not report the RNA update. The base station also assumes that the UE is still in the RRC inactive mode.

Figure 4:
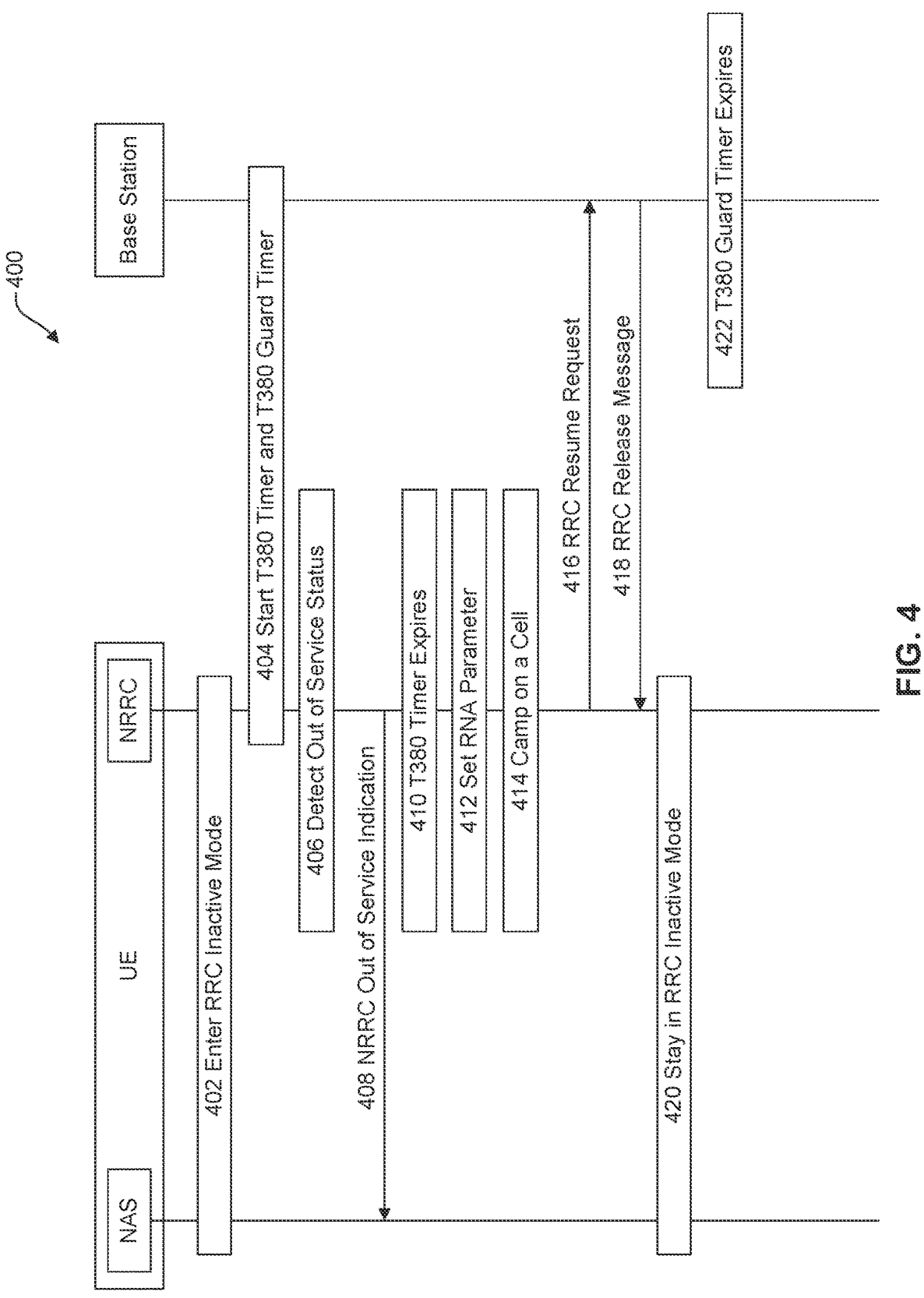
FIG. 4 illustrates an example method of the RNA reporting when a user equipment (UE) refrains from discarding the AS inactive context, according to aspects of the disclosure.

FIG. 4 illustrates an example method 400 of the RNA reporting when the UE refrains from discarding the AS inactive context. The example method 400 is provided for the purpose of illustration only and does not limit the disclosed aspects. As a convenience and not a limitation, FIG. 4 may be described with regard to elements of FIGS. 1, 2, and 8. The example method 400 may represent the operation of electronic devices (for example, the UE 102, and the base stations 104 and 108 of FIG. 1) implementing the RNA reporting. The example method 400 may also be performed by the electronic device 200 of FIG. 2, controlled or implemented by processor 210, and/or computer system 800 of FIG. 8. But the example method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

Here, steps 402 to 410 are similar to the steps 302 to 310 of FIG. 3. In summary, the UE enters the RRC inactive mode and camps on the first cell at 402 and enters the OOS status at 406.

At 412, the UE sets an RNA parameter. For example, when the T380 timer expires, the UE set a pendingRNAupdate parameter to "True." Thus, the UE may report the RNA update when the UE camps on the second cell. In addition, the UE refrains from discarding the AS inactive context when the pendingRNAupdate parameter is set to "True."

At 414, the UE camps on the second cell. The second cell can be in a different RNA. For example, the first cell is in a first RNA and the second cell is in a second RNA. In such a case, the UE triggers the RNA reporting in step 416. If the second cell is also in the first RNA, the UE skips steps 416 and 418 without reporting the RNA update. In some aspects, the UE triggers the RNA reporting in step 416 upon the expiration of the T380 timer in 410.

At 416, the UE transmits an RRC resume request message to the base station. The RRC resume request message can include a resume cause parameter that indicates the cause of the RRC resume request message to be an RNA update. The base station can determine based on the resume cause parameter that the UE uses the RRC resume message to report the RNA update, not to resume the RRC connection. In some aspects, the resume cause can also include other causes, such as mo-signaling, mo-data, mt-access, etc.

At 418, the base station transmits an RRC release message to the UE. The RRC release message configures the UE to stay in the RRC inactive mode. For example, the RRC release message may include a suspend configuration message, such as suspendconfiguration. The UE enters/stays in the RRC inactive mode based on the suspend configuration message. In some aspects, the base station may receive a notification from its network indicating a communication request, such as a phone call request, initiated by another device. In such a case, the base station can transmit an RRC resume message to the UE at 418 to resume the RRC connection between the UE and the base station. The UE can subsequently send an RRC resume complete message to the base station.

At 420, the UE stays in the RRC inactive mode. Because the UE still has the AS inactive context, the UE can enter the RRC connected mode using the AS inactive context when needed. For example, the UE may receive a paging message from the base station or the UE may initiate resuming the RRC connection when communications to the base station are required. In some aspects, the RRC release message of 418 may not include the suspend configuration message. In such a case, the UE enters the RRC idle mode in 420.

At 422, the second timer, such as the T380 guard timer, expires on the base station side. The base station can discard the second AS inactive store in the base station. As discussed above, the second timer is longer than the first timer. Therefore, the second timer expires at 422 after the first timer expires at 410. In some aspects, the base station stops the T380 guard timer after receiving the RRC resume request in 416 prior to an expected expiration time, such as shown in 422.

Figure 5:
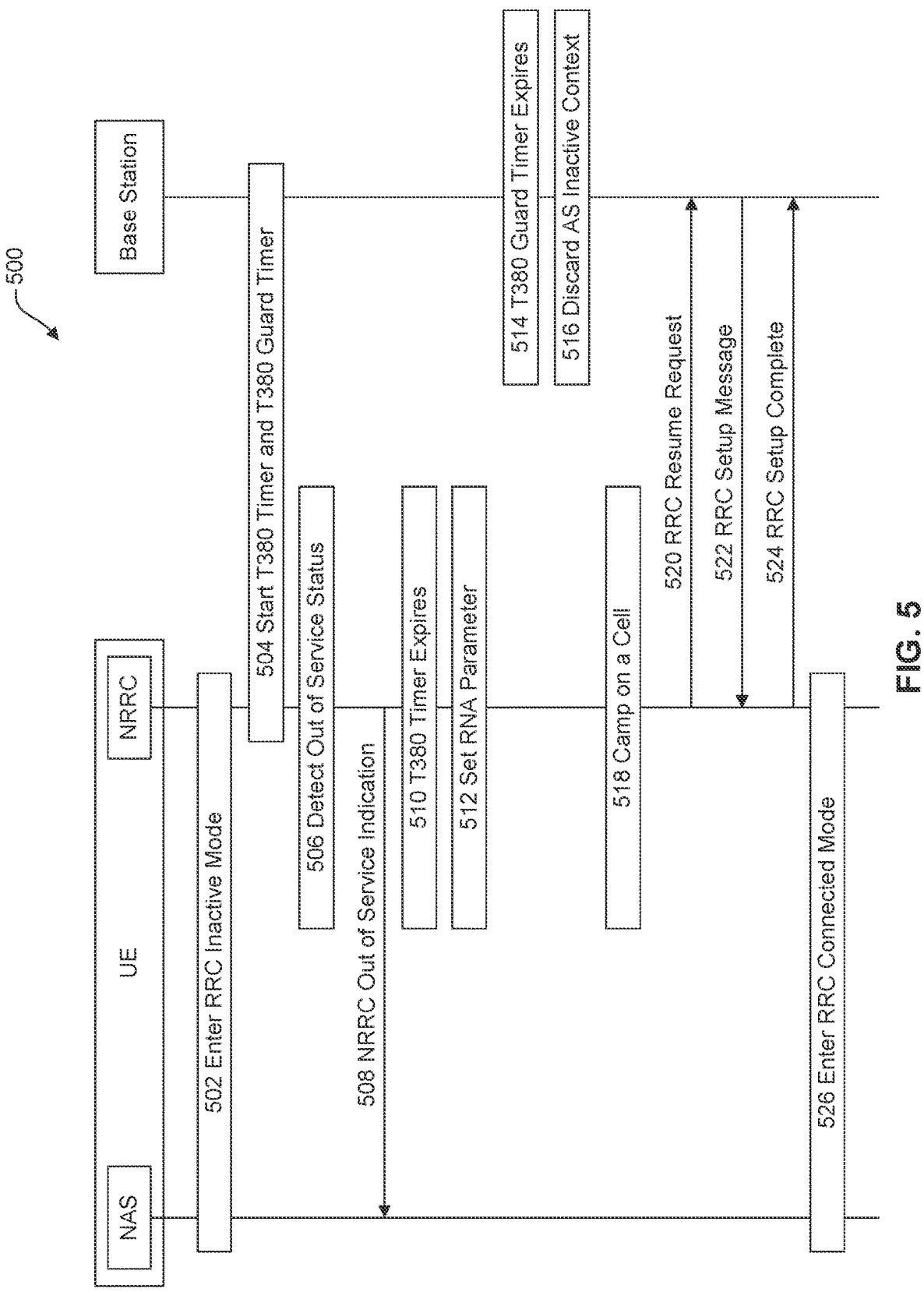
FIG. 5 illustrates an example method of the RNA reporting when the UE camps on a cell after a base station discards an AS inactive context, according to aspects of the disclosure.

FIG. 5 illustrates an example method 500 of the RNAU when the UE camps on a cell after a base station discards an AS inactive context. The example method 500 is provided for the purpose of illustration only and does not limit the disclosed aspects. As a convenience and not a limitation, FIG. 5 may be described with regard to elements of FIGS. 1, 2, and 8. The example method 500 may represent the operation of electronic devices (for example, the UE 102, and the base stations 104 and 108 of FIG. 1) implementing the RNA reporting. The example method 500 may also be performed by the electronic device 200 of FIG. 2, controlled or implemented by processor 210, and/or computer system 800 of FIG. 8. But the example method 500 is not limited to the specific aspects depicted in those figures and other systems may be used to perform the method, as will be understood by those skilled in the art. It is to be appreciated that not all operations may be needed, and the operations may not be performed in the same order as shown in FIG. 5.

Here, steps 502 to 512 are similar to the steps 402 to 412 of FIG. 4. In summary, the UE enters the RRC inactive mode and camps on the first cell at 502 and enters the OOS status at 506. The UE also set the RNA parameter at 512 after the first timer expires at 510.

At 514, the second timer, such as the T380 guard timer, expires and the base station discards the second AS inactive context at 516.

At 518, the UE camps on the second cell. Unlike the step 414 in FIG. 4, the UE camps on the second cell after the second timer expires on the base station side. For example, the UE may take a long time to search for a cell to camp on and fails to find a suitable cell to camp on prior to the expiration of the second timer.

At 520, the UE determines that the second cell is within the second RNA. However, the UE may not know that the base station has discarded the second AS inactive context at 516. In such a case, the UE transmits the RRC resume request message to the base station indicating an RNA update.

At 522, the base station transmits an RRC setup message to the UE instead of the RRC release message or the RRC resume confirmation message. This is because when the base station discards the second AS inactive context, the base station assumes that the UE is no longer in the RRC inactive mode. Therefore, when the base station receives the RRC resume request message at 520, the base station does not process it as an RNA update. Instead, the base station process the RRC resume request message as a request for an RRC connection setup. The base station transmits the RRC setup message to the UE as the UE is in the RRC idle mode. In other words, the base station triggers a fallback mechanism to recover the RRC connection.

In some aspects, at 522, the base station can alternatively transmit an RRC release message to resolve the AS inactive context mismatch. For example, the base station can send the RRC release message without including a suspend configuration message. The UE can enter the RRC idle mode after receiving the RRC release message.

At 524, the UE, in response to the RRC setup message, configures the RRC connection and transmits the RRC setup complete message to the base station. At 526, the UE enters the RRC connected mode.

In summary, because the UE camps on the second cell too late, the UE is not able to perform the RNA reporting and stay in the RRC inactive mode. However, the UE can still stay connected and enters the RRC connected mode via the fallback mechanism. However, the fallback mechanism requires the base station to perform additional signaling because of the inconsistency between the UE and the base station.

Figure 6:
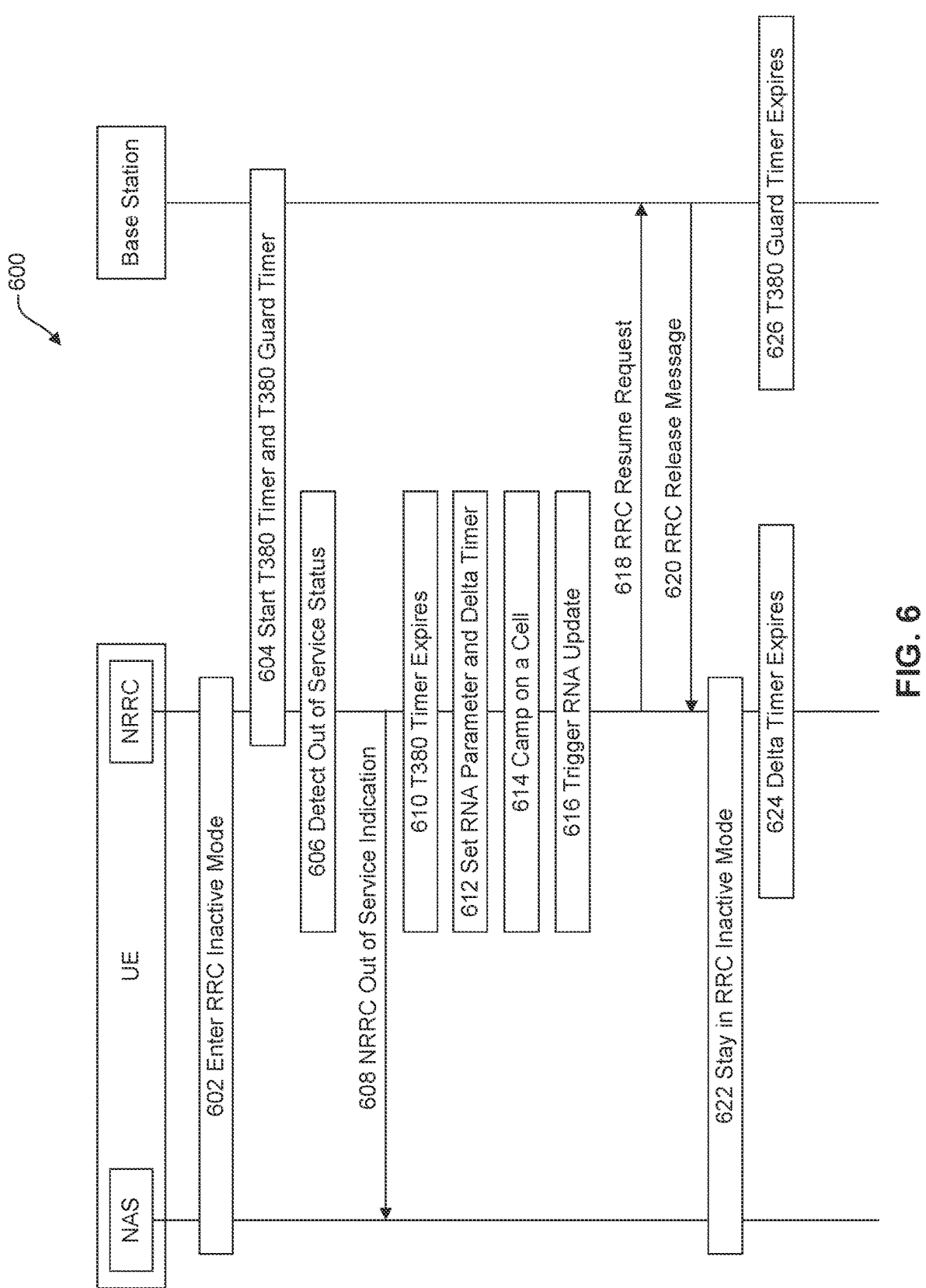
FIG. 6 illustrates an example method of the RNA reporting when the UE refrain from discarding the AS inactive context based on a delta timer, according to aspects of the disclosure.

FIG. 6 illustrates an example method 600 of the RNAU when the UE refrains from discarding the AS inactive context based on a delta timer. The example method 600 is provided for the purpose of illustration only and does not limit the disclosed aspects. As a convenience and not a limitation, FIG. 6 may be described with regard to elements of FIGS. 1, 2, and 8. The example method 600 may represent the operation of electronic devices (for example, the UE 102, and the base stations 104 and 108 of FIG. 1) implementing the RNA reporting. The example method 600 may also be performed by the electronic device 200 of FIG. 2, controlled or implemented by processor 210, and/or computer system 800 of FIG. 8. But the example method 600 is not limited to the specific aspects depicted in those figures and other systems may be used to perform the method, as will be understood by those skilled in the art. It is to be appreciated that not all operations may be needed, and the operations may not be performed in the same order as shown in FIG. 6.

Here, steps 602 to 610 are similar to the steps 402 to 410 of FIG. 4. In summary, the UE enters the RRC inactive mode and camps on the first cell at 602 and enters the OOS status at 606.

At 612, the UE set the RNA parameter to refrain the UE from discarding the AS active context, similar to the step 412 in FIG. 4. The UE also sets and starts a delta timer, where a period of the delta timer is the difference between a period of the first timer on the UE side and a period of the second timer on the base station side. The UE is aware of the period of the first timer. The UE can also be configured with the period of the second timer based on results of field tests. In some aspects, the period of the second timer can be X % longer than the period of the first timer. For example, the period of the second timer can be 20% longer than the period of the first time.

At 614, the UE camps on the second cell, which can be in the first RNA or the second RNA.

At 616, the UE determines whether or not to trigger the RNA report based on three conditions. The UE first determines whether or not the RNA parameter is set to "True." Here because the UE set the RNA parameter to be "True" at 612, the first condition is met. The UE then determines whether the UE camps on a cell in a different RNA. For example, if the second cell is within the second RNA, the second condition is met. In some aspects, the UE determines that the second condition is met regardless of the cell that the UE camps on. For example, the UE can determine that the second condition is met because the T380 timer expires. Finally, the UE determines whether the delta timer has expired. The third condition is met when the delta timer is still running. If all three conditions are met, the UE proceeds to the step 618.

At 618, the UE transmits the RRC resume request message to the base station to report the RNA update. For example, the RRC resume request message indicates that the UE camps on the second cell, instead of the first cell. Because the delta timer is still running, the second timer on the base station side is still running and the base station still has the second AS inactive context.

At 620, the base station may transmit the RRC release message to the UE acknowledging the RNA update and configuring the UE to stay in the RRC inactive mode. The base station may also transmit the RRC resume message to the UE to resume the RRC connection between the UE and the base station if a communication, such as a phone call, is expected.

At 622, the UE stays in the RRC inactive mode knowing that the RNA update is reported. On the other hand, if the base station transmits the RRC resume message to the UE at 620, the UE enters the RRC connected mode.

At 624, the delta timer expires on the UE side and at 626, the second timer expires on the base station side. The steps 624 and 626 occur simultaneously or close to each other in time. In other words, the delta timer enables the UE to predict when the second timer expires on the base station side. In some aspects, steps 624 and 626 indicate expected expiration times of the delta timer and the T380 guard timer. For example, the base station can stop the T380 guard timer after receiving the RRC resume request at 618.

In some aspects, the UE discards the AS inactive context after 624 and the base station discards the second AS inactive context after 626. The UE can determine that the AS inactive context is no longer useful because the base station discards the second AS inactive context. As discussed above, when the base station discards the second inactive context, the base station assumes that the UE is no longer in the RRC inactive context mode and triggers the fallback mechanism when receiving the RRC resume request message reporting the RNA update.

Figure 7:
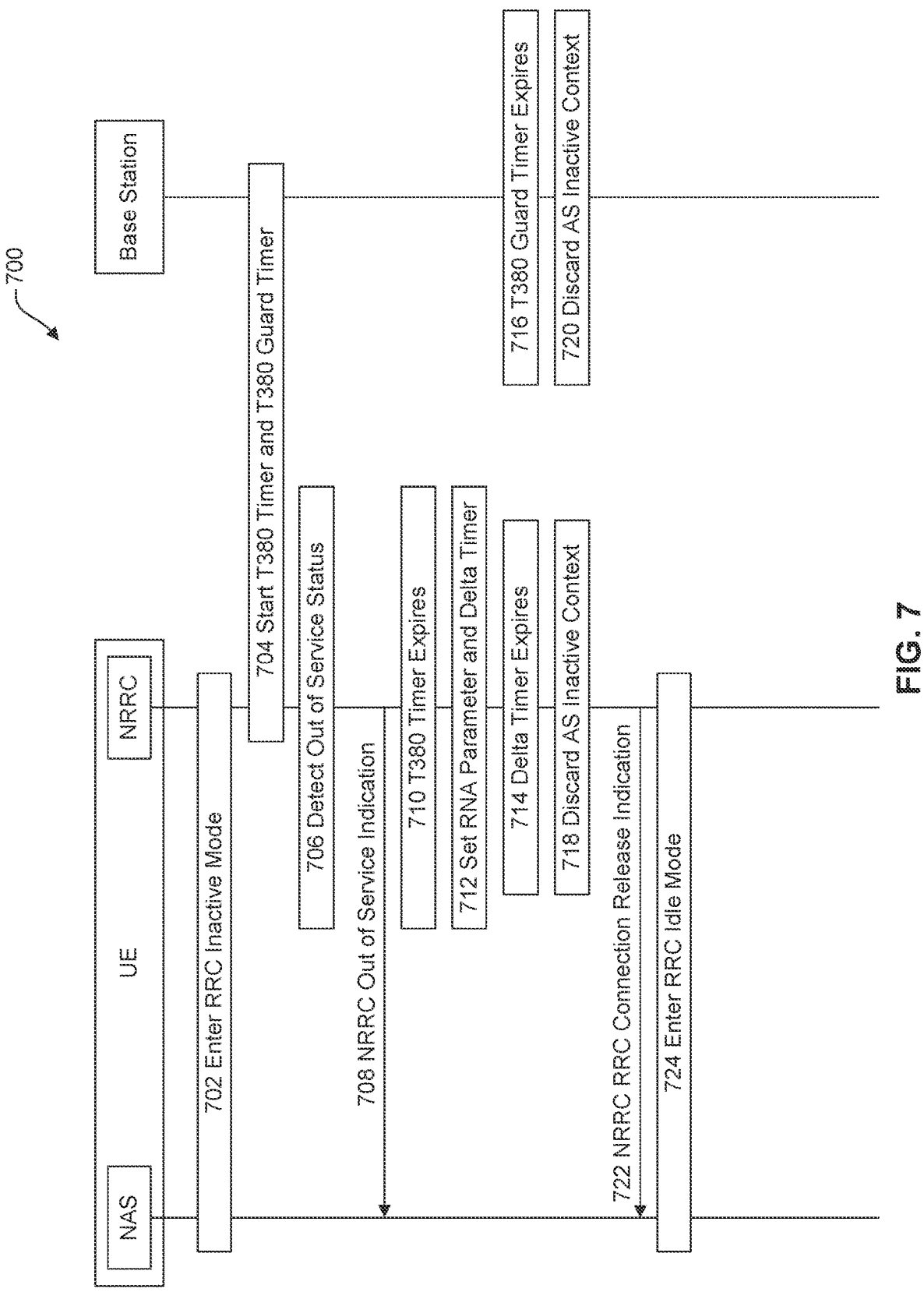
FIG. 7 illustrates an example method of the RNA reporting when the UE camps on a cell after the delta timer expires, according to aspects of the disclosure.

FIG. 7 illustrates an example method 700 of the RNAU when the UE camps on a cell after the delta timer expires. The example method 700 is provided for the purpose of illustration only and does not limit the disclosed aspects. As a convenience and not a limitation, FIG. 7 may be described with regard to elements of FIGS. 1, 2, and 8. The example method 700 may represent the operation of electronic devices (for example, the UE 102, and the base stations 104 and 108 of FIG. 1) implementing the RNA reporting. The example method 700 may also be performed by the electronic device 200 of FIG. 2, controlled or implemented by processor 210, and/or computer system 800 of FIG. 8. But the example method 700 is not limited to the specific aspects depicted in those figures and other systems may be used to perform the method, as will be understood by those skilled in the art. It is to be appreciated that not all operations may be needed, and the operations may not be performed in the same order as shown in FIG. 7.

Here, steps 702 to 712 are similar to the steps 602 to 712 of FIG. 6. In summary, the UE enters the RRC inactive mode and camps on the first cell at 702 and enters the OOS status at 706. The UE also set the RNA parameter and the delta timer at 712 after the first timer expires at 710.

At 714, the delta timer expires on the UE side and the UE discards the AS inactive context at 718. Similarly, the second timer expires on the base station side at 716 and the base station discards the second AS inactive context. In other words, the UE and base station discard the AS inactive context and the second AS inactive context, respectively, simultaneously or in time points close to each other.

At 722, the NRRC layer of the UE transmits the RRC connection release indication to the NAS layer indicating that the AS inactive context is discarded and the UE enters the RRC idle mode at 724.

In some aspects, the UE may camp on the second cell after discarding the AS inactive context. However, because the base station has discarded the second AS inactive context, the UE does not report the RNA update to the base station. In addition, when the UE initiates reestablishing the RRC connection, the UE transmits the RRC connection request message to the base station instead of the RRC resume request message. In such a case, the fallback mechanism is not triggered, which avoids additional signaling overhead, such as signaling between the base station and an access and mobility management function (AMF).

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some aspects, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Figure 8:
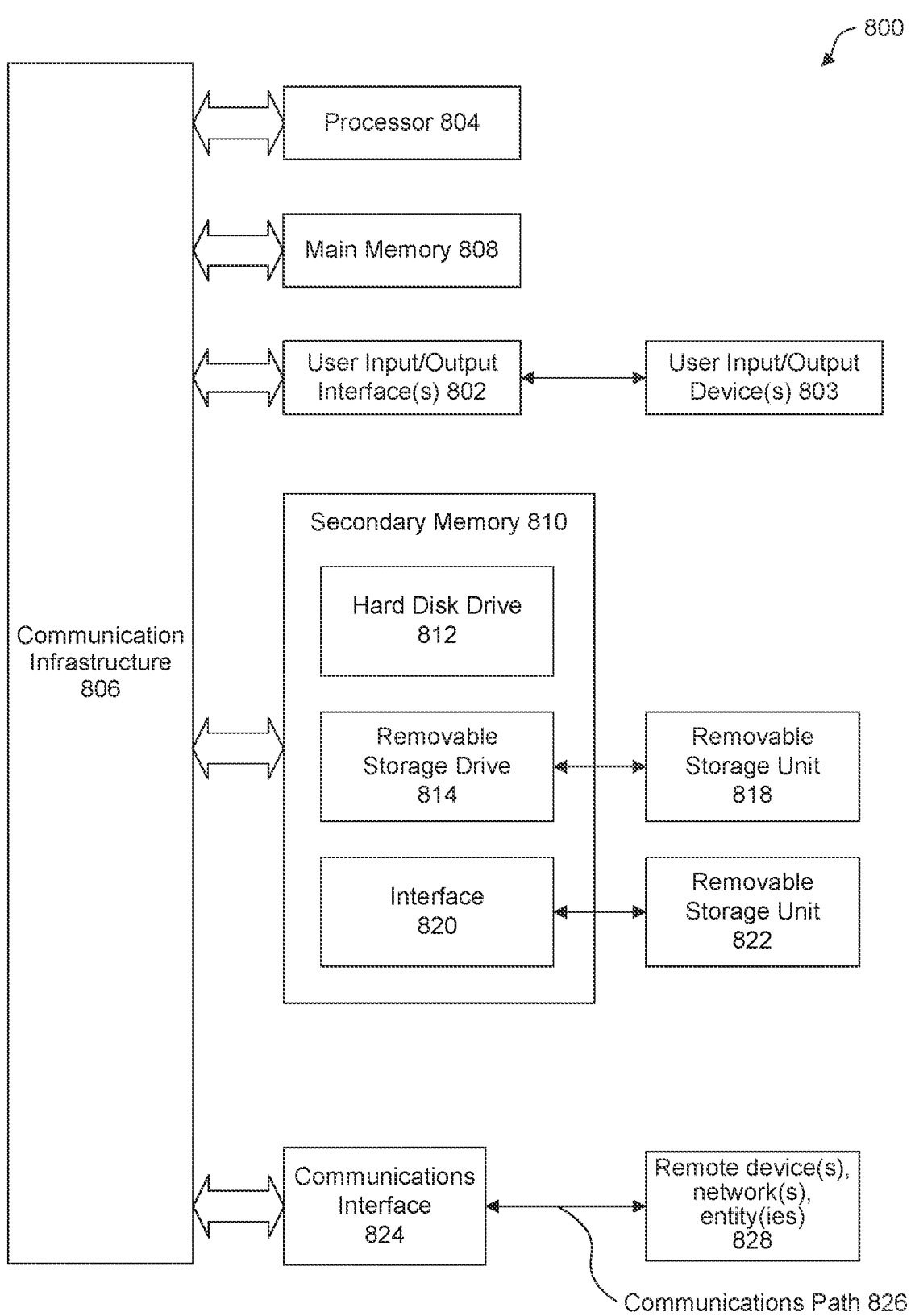
FIG. 8 is an example computer system for implementing some aspects of the disclosure or portion(s) thereof.

Based on the teachings contained in this disclosure, it will be apparent to persons skilled in the relevant art(s) how to make and use aspects of the disclosure using data processing devices, computer systems and/or computer architectures other than that shown in FIG. 8. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
a transceiver configured to enable wireless communications with a base station; and
a processor, communicatively coupled to the transceiver, and configured to:
enter a radio resource control (RRC) inactive mode;
start a first timer upon entering the RRC inactive mode;
detect an out of service (OOS) status for a first cell that the UE has camped on;

set a RAN-based notification area (RNA) parameter responsive to an expiration of the first timer, wherein the UE refrains from discarding an access stratum (AS) inactive context in the OOS status based on the RNA parameter;

camp on a second cell;

transmit a message to the base station to report an RNA update responsive to camping on the second cell;

start a delta timer upon the expiration of the first timer, wherein a period of the delta timer is based on a difference between a period of the first timer and a period of a second timer running at the base station;

determine that the delta timer has expired, wherein the delta timer expires at a same time as the second timer;

discard the AS inactive context responsive to the expiration of the delta timer; and enter an RRC idle mode responsive to discarding the AS inactive context.

2. The UE of claim 1, wherein the processor is further configured to:

in response to camping on the second cell, determine that the delta timer is running, wherein the message is transmitted to the base station responsive to determining that the delta timer is running.

3. The UE of claim 1, wherein to transmit the message to the base station, the processor is further configured to:

determine that the first cell is in a first RNA and the second cell is in a second RNA.

4. The UE of claim 1, wherein the processor is further configured to:

receive an RRC resume message from the base station;

resume an RRC connection based on the AS inactive context; and transmit an RRC resume complete message to the base station.

5. The UE of claim 1, wherein to detect the OOS status, the processor is further configured to:

measure a reference signal received power (RSRP) of the first cell; and determine that the RSRP is below a threshold.

6. A method of operating a user equipment (UE) comprising:

entering a radio resource control (RRC) inactive mode;

starting a first timer upon entering the RRC inactive mode;

detecting an out of service (QOS) status for a first cell that the UE has camped on;

setting a RAN-based notification area (RNA) parameter responsive to an expiration of the first timer, wherein the UE refrains from discarding an access stratum (AS) inactive context in the OOS status based on the RNA parameter;

camping on a second cell;

transmitting a message to a base station to report an RNA update responsive to camping on the second cell;

starting a delta timer upon the expiration of the first timer, wherein a period of the delta timer is based on a difference between a period of the first timer and a period of a second timer running at the base station;

determining that the delta timer has expired, wherein the delta timer expires at a same time as the second timer;

discarding the AS inactive context responsive to the expiration of the delta timer; and entering an RRC idle mode responsive to discarding the AS inactive context.

7. The method of claim 6, further comprising:

in response to camping on the second cell, determining that the delta timer is running, wherein the message is transmitted to the base station responsive to determining that the delta timer is running.

8. The method of claim 6, wherein transmitting the message to the base station further comprises:

determining that the first cell is in a first RNA and the second cell is in a second RNA.

9. The method of claim 6, further comprising:

receiving an RRC resume message from the base station;

resuming an RRC connection based on the AS inactive context; and transmitting an RRC resume complete message to the base station.

10. The method of claim 6, wherein detecting the OOS status further comprises:

measuring a reference signal received power (RSRP) of the first cell; and determining that the RSRP is below a threshold.

11. A non-transitory computer-readable medium (CRM) comprising instructions to, upon execution of the instructions by one or more processors of a user equipment (UE), cause the UE to perform operations, the operations comprising:

entering a radio resource control (RRC) inactive mode;

starting a first timer upon entering the RRC inactive mode;

detecting an out of service (OOS) status for a first cell that the UE has camped on;

setting a RAN-based notification area (RNA) parameter responsive to an expiration of the first timer, wherein the UE refrains from discarding an access stratum (AS) inactive context in the OOS status based on the RNA parameter;

camping on a second cell;

transmitting a message to a base station to report an RNA update responsive to camping on the second cell;

starting a delta timer upon the expiration of the first timer, wherein a period of the delta timer is based on a difference between a period of the first timer and a period of a second timer running at the base station;

determining that the delta timer has expired, wherein the delta timer expires at a same time as the second timer;

discarding the AS inactive context responsive to the expiration of the delta timer; and entering an RRC idle mode responsive to discarding the AS inactive context.

12. The non-transitory CRM of claim 11, the operations further comprising:

in response to camping on the second cell, determining that the delta timer is running, wherein the message is transmitted to the base station responsive to determining that the delta timer is running.

* * * * *